United States Patent
Li et al.

(10) Patent No.: US 11,281,166 B2
(45) Date of Patent: Mar. 22, 2022

(54) SMART WATCH AND METHOD FOR CHARGING SAME

(71) Applicant: JRD Communication Inc., Shenzhen (CN)

(72) Inventors: Bingquan Li, Shenzhen (CN); Xianming Zhuang, Shenzhen (CN); Hua Zhang, Shenzhen (CN); Sai Xie, Shenzhen (CN)

(73) Assignee: JRD Communication Inc., Shenzhen (CN)

( * ) Notice: Subject to any disclaimer, the term of this patent is extended or adjusted under 35 U.S.C. 154(b) by 348 days.

(21) Appl. No.: 16/480,316

(22) PCT Filed: Jun. 12, 2017

(86) PCT No.: PCT/CN2017/087927
§ 371 (c)(1),
(2) Date: Jul. 24, 2019

(87) PCT Pub. No.: WO2018/137305
PCT Pub. Date: Aug. 2, 2018

(65) Prior Publication Data
US 2019/0384231 A1 Dec. 19, 2019

(30) Foreign Application Priority Data
Jan. 24, 2017 (CN) .......................... 201710060300.2

(51) Int. Cl.
*G04G 17/06* (2006.01)
*G04C 10/00* (2006.01)
(Continued)

(52) U.S. Cl.
CPC ............. *G04G 17/06* (2013.01); *G04C 10/00* (2013.01); *H01R 13/2407* (2013.01);
(Continued)

(58) Field of Classification Search
CPC ...... G04G 17/06; G04G 17/083; G04G 21/00; G04G 17/00; G04C 10/00; H01R 13/2407;
(Continued)

(56) References Cited

U.S. PATENT DOCUMENTS 6,528,203 B1   3/2003   Mitamura
6,536,941 B1 *  3/2003   Fang ..................... G04B 47/00
                                                           368/278

(Continued)

FOREIGN PATENT DOCUMENTS

CN   104767054   7/2015
CN   204614998   9/2015
(Continued)

*Primary Examiner* — Edwin A. Leon

(57) ABSTRACT

A smart watch includes a watch body and watch straps respectively connected to two sides of the watch body. At least one watch strap includes charging contacts, a USB plug, and cables connected to the charging contacts and the USB plug, and the charging contacts are disposed on a back of the watch strap. Charging terminals configured to cooperate with the charging contacts are disposed on a back of the watch body. The charging contacts and the charging terminals are electrically contacted to charge the smart watch after the watch strap disposed with the USB plug is attach to the back of the watch body.

20 Claims, 2 Drawing Sheets

(51) Int. Cl.
*H01R 13/24* (2006.01)
*H01R 24/28* (2011.01)
*H02J 7/00* (2006.01)
*H01R 107/00* (2006.01)

(52) U.S. Cl.
CPC ............... *H01R 24/28* (2013.01); *H02J 7/00* (2013.01); *H02J 7/0045* (2013.01); *H01R 2107/00* (2013.01)

(58) Field of Classification Search
CPC . H01R 24/28; H01R 2107/00; G04B 37/1486
USPC ....................................................... 368/204
See application file for complete search history.

(56) References Cited

U.S. PATENT DOCUMENTS

| | | | |
|---|---|---|---|
| 2003/0099164 A1* | 5/2003 | Noirjean | A44C 5/0007 368/282 |
| 2004/0081025 A1* | 4/2004 | Chen | G04B 37/1486 368/10 |
| 2006/0140055 A1* | 6/2006 | Ehrsam | G04G 17/06 368/10 |
| 2016/0181840 A1 | 6/2016 | Kang | |
| 2016/0363957 A1 | 12/2016 | Stroetmann | |

FOREIGN PATENT DOCUMENTS

| | | |
|---|---|---|
| CN | 105048548 | 11/2015 |
| CN | 105054506 | 11/2015 |
| CN | 204740440 | 11/2015 |
| WO | WO 2018/137305 | 8/2018 |

\* cited by examiner

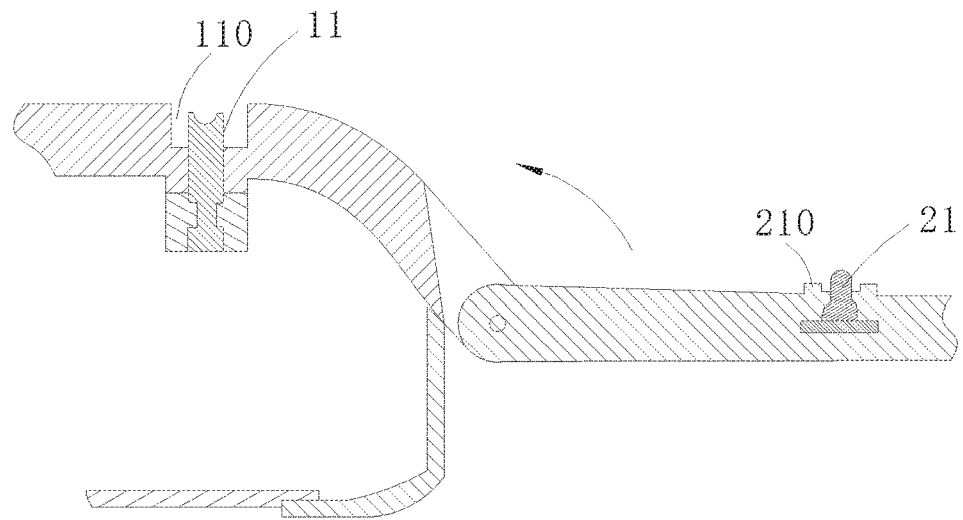
Fig. 3
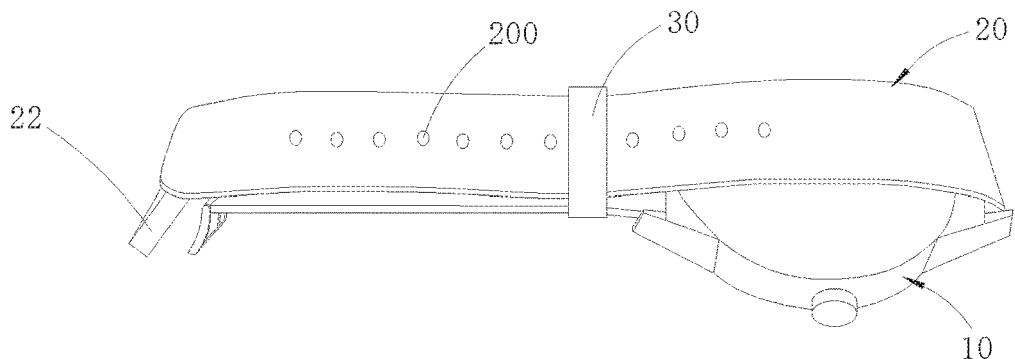
Fig. 4
| The watch strap with the USB plug is rotated to allow the charging contacts on the watch strap to be in contact with the charging terminals on a back of the watch body. |
|---|
| Free ends of the two watch straps are attached and fixed together. |
| The smart watch is charged through the USB plug. |
Fig. 5

SMART WATCH AND METHOD FOR CHARGING SAME

RELATED APPLICATIONS

This application is a National Phase of PCT Patent Application No. PCT/CN2017/087927 having International filing date of Jun. 12, 2017, which claims the benefit of priority of Chinese Patent Application No. 201710060300.2 filed on Jan. 24, 2017. The contents of the above applications are all incorporated by reference as if fully set forth herein in their entirety.

FIELD AND BACKGROUND OF THE INVENTION

The present disclosure relates to the field of smart watch, more particularly, to a smart watch and a charging method thereof.

At present, the smart watches on the market are additionally designed to have their separate charging cables, and the part of each charging cable connected to the watch is designed to be a different non-standard design that varies with different manufacturers. A user needs to carry a specific charging cable to charge the watch when going out, which is very inconvenient for the user's experience.

SUMMARY OF THE INVENTION

The present disclosure provides a smart watch and a charging method thereof so that a user does not need to carry a specific charging cable when going out, which improves the user's experience.

The present disclosure adopts the following technical schemes:

The present disclosure provides a smart watch. The smart watch comprises a watch body and watch straps respectively connected to two sides of the watch body. At least one watch strap comprises charging contacts, a USB plug, and cables connected to the charging contacts and the USB plug, and the charging contacts are disposed on a back of the watch strap. Charging terminals configured to cooperate with the charging contacts are disposed on a back of the watch body. The charging contacts and the charging terminals are electrically contacted to charge the smart watch after the watch strap disposed with the USB plug is attach to the back of the watch body.

According to an embodiment of the present disclosure, the cables are embedded in the watch strap.

According to an embodiment of the present disclosure, each of the cables is a flexible circuit board.

According to an embodiment of the present disclosure, a pin and a row of holes are respectively disposed on two watch straps on two sides of the watch body, and the holes are located in the watch strap disposed with the USB plug, and two cables are respectively located on two sides of the holes.

According to an embodiment of the present disclosure, the watch strap disposed with the USB plug is rotatably connected to the watch body.

According to an embodiment of the present disclosure, the charging contact is a movable ejector pin, the charging terminal is a conductive terminal of a V-shaped elastic sheet or a conductive terminal having a recess at its end portion.

According to an embodiment of the present disclosure, an annular boss is disposed in an outer periphery of at least one charging contact, an engaging slot for inserting the boss is formed in the back of the watch body, and one of the charging terminals is disposed in the engaging slot.

According to an embodiment of the present disclosure, the USB plug is disposed at a free end of the watch strap.

According to an embodiment of the present disclosure, the smart watch further comprises a collar disposed on a watch strap without the USB plug.

Another objective of the present disclosure is to provide a charging method for any of the above smart watches. The charging method comprises: rotating the watch strap with the USB plug to allow the charging contacts on the watch strap to be in contact with the charging terminals on the back of the watch body, then attaching and fixing free ends of two watch straps, and finally charging the smart watch through the USB plug.

The present disclosure integrate the USB plug and the cables in the watch strap, disposes the charging contacts on the watch strap, and disposes charging terminals on the back of the watch body. The smart watch can be charged through bending or rotating the watch straps to contact the charging contacts and the charging terminals. The user does not need to carry a specific charging cable when going out, which is very convenient.

BRIEF DESCRIPTION OF THE SEVERAL VIEWS OF THE DRAWINGS

FIG. 3 is a schematic diagram of a main charging structure of a smart watch according to one embodiment of the present disclosure.

FIG. 4 is a schematic diagram of a charging state of a smart watch according to one embodiment of the present disclosure.

FIG. 5 is a schematic diagram of a charging method of a smart watch according to one embodiment of the present disclosure.

DESCRIPTION OF SPECIFIC EMBODIMENTS OF THE INVENTION

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

Figure 1:
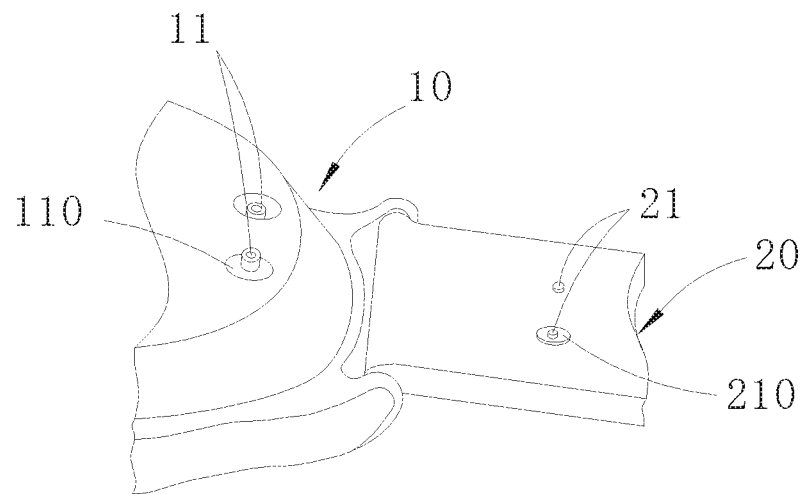
FIG. 1 is a schematic diagram of a partial structure of a smart watch according to one embodiment of the present disclosure.
Figure 2:
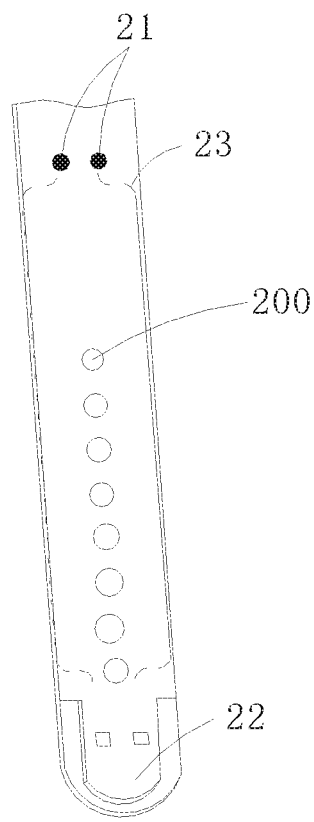
FIG. 2 is a schematic diagram of a partial structure of a watch strap according to one embodiment of the present disclosure.

A description is provided with reference to FIG. 1 to FIG. 2. A smart watch according to the present disclosure comprises a watch body 10 and two watch straps 20 respectively connected to two sides of the watch body 10. At least one watch strap 20 comprises charging contacts 21, a USB plug 22, and cables 23 connected to the charging contacts 21 and the USB plug 22, and the charging contacts 21 are disposed on a back of the watch strap 20. Charging terminals 11 configured to cooperate with the charging contacts 21 are disposed on a back of the watch body 10. After the watch strap 20 disposed with the USB plug 22 is rotated or bent to attach to the back of the watch body 10, the charging contacts 21 are electrically contacted to the charging terminals 11. The smart watch is thus charged. It can be understood that numbers of the charging contacts 21 and the charging terminals 11 are respectively two.

As shown in FIG. 2, the cables 23 are embedded in the watch strap 20, the USB plug 22 is disposed at a free end of the watch strap 20, and the charging contacts 21 are close to the watch body 10 according to the present embodiment. A pin (not shown in the figure) and a row of holes 200 extending along a lengthwise direction of the watch strap 20 are respectively disposed on the two watch straps 20 on two sides of the watch body 10, and the pin cooperates with the different holes 200 to achieve belt length adjustment so as to accommodate different wearers. The holes 200 are located in the watch strap 20 disposed with the USB plug 20, and the two cables 23 are respectively located on two sides of the holes 200. The cables 23 on the two sides are separated by the row of holes 200 in a middle into two mutually unaffected lines, and the charging lines are not short-circuited even if the watch strap 20 is deformed and twisted.

Each of the cables 23 may be a flexible circuit board formed in the watch strap 20 by an injection molding or laminating process.

A description is provided with reference to FIG. 3. In the present embodiment, the watch strap 20 disposed with the USB plug 22 is rotatably connected to the watch body 10. In greater detail, a rotating shaft may be disposed between a pair of mounting ears of the watch body 10, and the rotating shaft passes through one end of the watch strap 20 and is fixed between the two mounting ears. As a result, the watch strap 20 and the watch body 10 can rotate relative to each other.

Preferably, a length of the watch strap 20 between the charging contacts 21 and the rotating shaft is the same as a path length between the rotating shaft and the charging terminals 11, so that when the watch strap 20 is rotated and attached to the back of the watch body 10, the charging contacts 21 are exactly in contact with the charging terminals 11.

The charging contact 21 is a movable ejector pin, that is, a spring is compressed between a metal pin and an internal conductive structure. A circumference of the pin is limited by the watch strap 20 without being disengaged, so that the charging contact 21 and the charging terminal 11 are elastically contacted to well protect the charging structure. Correspondingly, the charging terminal 11 is embedded in the watch body 10, and its end portion is open and has a recess for the charging contact 21 to be engaged. In other embodiments, the charging terminal 11 may be a conductive terminal of a "V" shaped elastic sheet. The clamping force of the elastic sheet can be utilized to fasten the pin.

In order to ensure the reliability of the cooperation between the charging contact 21 and the charging terminal 11, an annular boss 210 is disposed in an outer periphery of at least one charging contact 21. An engaging slot 110 for inserting the boss 210 is formed in the back of the watch body 10, and the charging terminal 11 is disposed in the engaging slot 110. The boss 210 and the engaging slot 110 have an interference fit.

A description is provided with reference to FIG. 4. Another watch strap 20 of the smart watch according to the present embodiment without the USB plug 22 is sleeved with a collar 30. The collar 30 is used to bind the two watch straps 20 after the charging contacts 21 are in electrical contact with the charging terminals 11 to ensure that the charging contacts 21 and the charging terminals 11 are not misaligned or separated. The smart watch than can be charged through the USB plug 22 at one end of the watch strap 20.

A description is provided with reference to FIG. 5. When the smart watch is charged, the charging method according to the present embodiment comprises: The watch strap 20 with the USB plug 22 is rotated to allow the charging contacts 21 on the watch strap 20 to be in contact with the charging terminals 11 on a back of the watch body 10. Then, free ends of the two watch straps 20 are attached and fixed together. Finally, the smart watch is charged through the USB plug 22. Since the USB plug 22 is a universal standard USB plug, it can be directly connected to a computer or an adapter to perform charging. No additional charging cable is necessary.

The present disclosure integrates the USB plug and the cables in the watch strap, disposes the charging contacts on the watch strap, and disposes charging terminals on the back of the watch body. The smart watch can be charged through bending or rotating the watch straps to contact the charging contacts and the charging terminals. The user does not need to carry a specific charging cable when going out, which is very convenient.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A smart watch comprising:
   a watch body;
   charging terminals, disposed on a back of the watch body; and
   watch straps connected to two sides of the watch body, at least one watch strap comprising:
   charging contacts, disposed on a back of the watch strap and configured to cooperate with the charging terminals;
   a Universal Serial Bus (USB) plug; and
   cables, connected to the charging contacts and the USB plug, charging terminals configured to cooperate with the charging contacts being disposed on a back of the watch body;
   wherein the watch strap disposed with the USB plug is rotatably connected to the watch body through a rotating shaft, and a length of the watch strap between the charging contacts and the rotating shaft is the same as a path length between the rotating shaft and the charging terminals; and wherein the charging contacts and the charging terminals are electrically contacted to charge the smart watch after the watch strap disposed with the USB plug is attach to the back of the watch body.

2. The smart watch as claimed in claim 1, wherein the cables are embedded in the watch strap.

3. The smart watch as claimed in claim 2, wherein a pin and a row of holes are respectively disposed on two watch straps on two sides of the watch body, the holes are located in the watch strap disposed with the USB plug, and two cables are respectively located on two sides of the holes.

4. The smart watch as claimed in claim 1, further comprising a collar disposed on a watch strap without the USB plug.

5. The smart watch as claimed in claim 1, wherein the charging contact is a movable ejector pin, the charging terminal is a conductive terminal of a V-shaped elastic sheet or a conductive terminal having a recess at its end portion; and wherein an annular boss is disposed in an outer periphery of at least one charging contact, an engaging slot for inserting the boss is formed in the back of the watch body, and one of the charging terminals is disposed in the engaging slot.

6. The smart watch as claimed in claim 5, further comprising a collar disposed on a watch strap without the USB plug.

7. A smart watch comprising:
 a watch body;
 charging terminals, disposed on a back of the watch body; and
 watch straps connected to two sides of the watch body, at least one watch strap comprising:
  charging contacts, disposed on a back of the watch strap and configured to cooperate with the charging terminals;
  a Universal Serial Bus (USB) plug; and
  cables, connected to the charging contacts and the USB plug, charging terminals configured to cooperate with the charging contacts being disposed on a back of the watch body;
 wherein the charging contacts and the charging terminals are electrically contacted to charge the smart watch after the watch strap disposed with the USB plug is attach to the back of the watch body, and the charging contacts and the USB plug are located at two opposite sides of the at least one watch strap.

8. The smart watch as claimed in claim 7, wherein the cables are embedded in the watch strap.

9. The smart watch as claimed in claim 8, wherein each of the cables is a flexible circuit board.

10. The smart watch as claimed in claim 8, wherein a pin and a row of holes are respectively disposed on two watch straps on two sides of the watch body, the holes are located in the watch strap disposed with the USB plug, and two cables are respectively located on two sides of the holes.

11. The smart watch as claimed in claim 7, wherein the watch strap disposed with the USB plug is rotatably connected to the watch body.

12. The smart watch as claimed in claim 7, wherein the charging contact is a movable ejector pin, the charging terminal is a conductive terminal of a V-shaped elastic sheet or a conductive terminal having a recess at its end portion.

13. The smart watch as claimed in claim 12, wherein an annular boss is disposed in an outer periphery of at least one charging contact, an engaging slot for inserting the boss is formed in the back of the watch body, and one of the charging terminals is disposed in the engaging slot.

14. The smart watch as claimed in claim 7, wherein the USB plug is disposed at a free end of the watch strap.

15. The smart watch as claimed in claim 7, further comprising a collar disposed on a watch strap without the USB plug.

16. The smart watch as claimed in claim 10, further comprising a collar disposed on a watch strap without the USB plug.

17. A charging method of a smart watch, wherein the smart watch comprises:
 a watch body;
 charging terminals, disposed on a back of the watch body; and
 watch straps connected to two sides of the watch body, at least one watch strap comprising:
  charging contacts, disposed on a back of the watch strap and configured to cooperate with the charging terminals;
  a USB plug; and
  cables, connected to the charging contacts and the USB plug;
 the charging method comprises:
  rotating the watch strap with the USB plug to allow the charging contacts on the watch strap to be in contact with the charging terminals on the back of the watch body;
  attaching and fixing free ends of two watch straps; and
  charging the smart watch through the USB plug.

18. The charging method as claimed in claim 17, wherein the cables are embedded in the watch strap, and a pin and a row of holes are respectively disposed on two watch straps on two sides of the watch body, and wherein the holes are located in the watch strap disposed with the USB plug, and two cables are respectively located on two sides of the holes.

19. The charging method as claimed in claim 17, wherein the charging contact is a movable ejector pin, the charging terminal is a conductive terminal of a V-shaped elastic sheet or a conductive terminal having a recess at its end portion; and wherein an annular boss is disposed in an outer periphery of at least one charging contact, an engaging slot for inserting the boss is formed in the back of the watch body, and one of the charging terminals is disposed in the engaging slot.

20. The charging method as claimed in claim 17, wherein another watch strap of the smart watch without the USB plug is sleeved with a collar, the charging method further comprises using the collar to bind the two watch straps after the charging contacts are in electrical contact with the charging terminals.

* * * * *